United States Patent [19]

Otey et al.

[11] 4,171,513

[45] Oct. 16, 1979

[54] SECURE COMMUNICATIONS SYSTEM

[75] Inventors: Charles R. Otey, Reeds Ferry; Burton C. Winkler, Jr., Nashua, both of N.H.

[73] Assignee: Sanders Associates, Inc., Nashua, N.H.

[21] Appl. No.: 853,582

[22] Filed: Jul. 22, 1969

Related U.S. Application Data

[63] Continuation of Ser. No. 578,422, Sep. 6, 1966.

[51] Int. Cl.[2] .......................... H04K 1/00; H04L 9/00

[52] U.S. Cl. ........................................ 325/32; 178/22; 179/1.5 M; 179/1.5 E

[58] Field of Search ............................ 178/22; 325/32; 179/1.5 M, 1.5 E

[56] References Cited

U.S. PATENT DOCUMENTS

| | | | |
|---|---|---|---|
| 3,038,028 | 6/1962 | Henze | 178/22 |
| 3,153,196 | 10/1964 | McGuire | 332/9 |
| 3,244,808 | 4/1966 | Roberts | 325/42 X |
| 3,303,335 | 2/1967 | Pryor | 325/65 |
| 3,305,636 | 2/1967 | Webb | 325/40 X |
| 3,427,399 | 2/1969 | Ehrat | 178/22 |

*Primary Examiner*—Malcolm F. Hubler

*Attorney, Agent, or Firm*—Richard I. Seligman; Louis Etlinger

[57] ABSTRACT

A privacy communication system is herein disclosed comprising apparatus for digitizing information to be transmitted, apparatus for logically adding a selected pseudo-random digital code to the digitized information, apparatus for removing the pseudo-random code upon reception and apparatus for synchronizing the transmitted and received pseudo-random codes.

1 Claim, 12 Drawing Figures

SECURE COMMUNICATIONS SYSTEM

This application is a continuation of Ser. No. 578,422, Sept. 6, 1966.

This invention relates to so-called "scrambler" systems, whereby voice or other information is transmitted via radio, telephone, audio, light, or any other propagation medium in a condition that is unintelligible to all save certain selected receivers. More particularly, the invention relates to a privacy communication system in which the information to be transmitted is digitized in phase and amplitude, clocked and logically added to a pseudorandom digital code. The signal thus transmitted is received by apparatus having a coincident clock frequency and pseudo-random code, and means for synchronizing the received signals therewith. Logical subtraction of the pseudo-random code by the receiver circuit reconstitutes intelligible information.

The state-of-the-art privacy communication systems are commonly based on frequency inversion principles. That is, one sideband of a signal that has been modulated on a first carrier is modulated on a second carrier in such a manner as to invert the frequencies. The original signal is obtained at the receiver by reversing this process. Alternatively, this system has been modified such that the signal band is divided into narrow bands by means of filters, with the several bands being interchanged or inverted. These systems, however, permit only a limited number of combinations or codes, and it is relatively easy for unauthorized receivers to unscramble them. Furthermore, the bandwidth requirements of these systems add to the complexity and cost of the equipment. Other privacy communication systems currently in use that have greater privacy potential require either a separate synchronizing channel or extremely accurate frequency standards. Such systems start two pseudo-random code generators at the same time, and therefore require a precise frequency source, such as the atomic clock, as well as a separate command channel. A synchronizing clock signal must be transmitted periodically, and propagation delay factors must be considered. Such a system, of course, requires complex, expensive equipment and frequent critical adjustment of the timing components.

Accordingly, it is a principal object of the present invention to provide a new and improved privacy communication system.

It is another object of this invention to provide a privacy communication system having virtually any number of possible code combinations.

It is another object of this invention to provide a privacy communication system having narrow bandwidth requirements and employing conventional communications equipment.

It is another object of this invention to provide a privacy communication system that eliminates the need for separate synchronizing channels and extremely accurate frequency standards.

It is another object of this invention to provide a privacy communication system employing a novel phase locking scheme using random multiples of an oscillator period as a reference.

These, together with other objects and features of the invention, will be more readily understood from the following detailed description, taken in conjunction with the accompanying drawings, wherein like items are given like reference numerals throughout and wherein.

Figure 1:
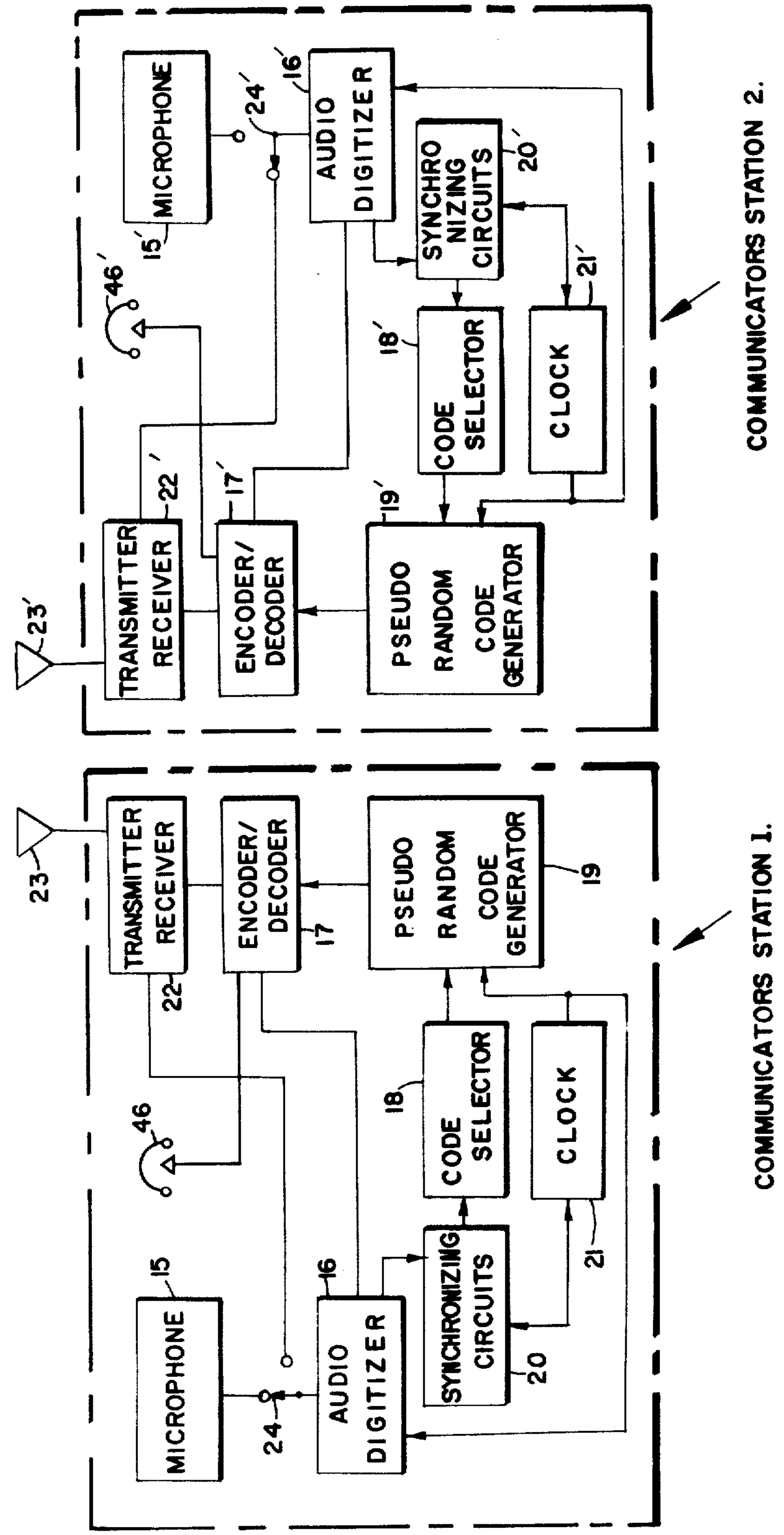
FIG. 1 illustrates in block diagram form the basic components of the privacy communication system of the invention.

The privacy communication system of this invention comprehends transmitting messages in scrambled digital form and subsequently unscrambling the received message by means of a novel synchronizing technique and coincident pseudo-random digital code. In the transmit mode of operation, one of the communication stations digitizes the message (voice, for instance) to be transmitted. This is accomplished by amplifying, pre-emphasizing and clipping the voice modulated waveform. The clipped, pre-emphasized waveform is then applied to a Schmitt trigger circuit to insure that pulses generated effect instantaneous change from one logic state to another. Each communication station includes a clock which generates a pulse train of a given basic system clock frequency. The clipped, pre-emphasized waveform is then clocked with the pulse train, thereby causing each zero crossing or change of logic state to occur at some even multiple of the clock frequency. The clocked waveform is then logically added to a pseudo-random digital code pulse train, and the composite code signal is transmitted. At the receiving station, an identical pseudo-random code is generated and logically subtracted from the received signal, thereby reproducing the original digitized signal, which is an intelligible voice message. Coordination of the pseudo-random codes is accomplished by the use of identical code cards at each communication station providing for synchronous starting of the two code streams. Synchronization of the signals is maintained by continually adjusting the clock at the receiving station to the zero crossings of the received signal.

By way of example, the present invention will be described with reference to a particular privacy communication system and particular embodiments; specific values and parameters will be referred to. It is to be understood that these embodiments and parameters are given by way of example only and are not intended to suggest that the invention is in any way limited thereto or thereby. Obviously, any means for carrying out the principles of the invention are equally applicable and fall within the scope of the invention.

In the system to be hereinafter described, audio from the microphone at the transmit end is synchronously dithered, bandpassed from 300 to 3000 cycles per second, pre-emphasized at 20 db per decade, and digitally sampled and stored every 100 microseconds. The audio signal at this point is digital, quiet between words and is both very readable and relatively pleasant to listen to. Code generation is in a pseudo-random code register of 15 shift stages such that there are $2^{15}$-1, or 32,767, discretely different starting points. Thus, there are 32,767 different "code of the day" card key codes, of which both the transmission and reception ends must exactly agree before any intelligence is received.

The code generator is sequenced at 100-microsecond data rate. Its output code point is then phased into a "non return to zero" type function to remove all low frequency components longer than one data period in length. The phased code, which is also synchronous with the digital audio, is joined with the digital audio in an exclusive OR circuit which maintains polarity balance and makes the digital voice scrambled. It is the exclusive OR output which is fed to the transmitter modulator. A square wave tone is transmitted for a fraction of a second after the start of a transmission for the purpose of allowing the clock at the receiver to achieve phase lock to the signal and start the receiver code register.

The signal, as transmitted, has no coherence whatsoever to that of voice. It merely sounds like a rushing noise, whether or not someone is talking.

At the receive end, the signal is fed from the receiver through the same circuitry where the inverse logical functions are performed and the code extracted from the signal, leaving digital voice, which is de-emphasized at 20 db per decade and applied to the receiver headset.

A typical system employing the principles of the invention is illustrated by the functional block diagram of FIG. 1. For convenience of explanation, only two communication stations are illustrated, with communication station 1 being in the transmit mode and communication station 2 being the in the receive mode. Any number of communication stations are, of course, within the scope of the invention; and each communication station operates in both the transmit and receive modes. In operation, a voice message is articulated to the microphone 15 of communication station 1. The voice modulated signal generated thereby is digitized in audio digitizer 16 and delivered to the encoder-decoder 17. Concurrently, pseudo-random code generator 19 generates and delivers to encoder-decoder 17 a particular code of the day determined by code selector 18. Clock 21 and synchronizing circuits 20 cooperate with encoder-decoder 17 to logically add the digitized voice modulated signal to the pseudo-random code. The composite signal output of encoder-decoder 17 is then transmitted by transmitter-receiver unit 22 and antenna 23. The signal so transmitted is received at communication station 2 by antenna 23' and transmitter-receiver 22'. The signal is then delivered to encoder-decoder 17'. As the composite signal is being received at encoder-decoder 17', an identical pseudo-random code is being generated by pseudo-random code generator 19' in response to the information supplied thereto by code selector 18'. Encoder-decoder 17' effectively combines the pseudo-random code generated in pseudo-random code generator 19' with the incoming composite signal so as to logically subtract the pseudo-random code generated by pseudo-random code generator 19 therefrom. The output of encoder-decoder 17', therefore, is substantially the digitized audio signal originally developed in audio digitizer 16, and is fed to earphones 46'. In the event it is desired to transmit a message from communication station 2 to communication station 1, switches 24 and 24' are put in their opposite positions, and the message to be delivered is articulated into microphone 15'.

In the operation of the system as above described, communication station 1, at the start of the transmission, emits an unmodulated square wave at the basic equipment frequency. This waveform is produced for at least a preset period of time on the order of 500 ms to allow time for stabilization of the transmitter output, receiver agc transient response, and receiver phase lock, to be described later. After the preset time delay produced by the synchronizing circuits, the lack of the square wave causes the selected code to set into the pseudo-random code generator and causes encoding to begin. From this time on, the output is a pseudo-random pulse train made up of the digitized voice, logically added with the code from the code generator.

The digitized voice is produced in the audio circuits by differentiating and clipping, then gating with the reference clock. The voice waveform is thus digitized in both amplitude and time. The resulting waveform is a rectangular wave with zero crossings only at multiples of the clock period. The audio spectrum is essentially unchanged by modulation, since the output has a random amplitude characteristic and zero crossings only at multiples of the clock interval, whether or not voice modulation is present. The "randomness" of the waveform, of course, depends on the length of the pseudo-random sequence. The present example comprehends a sequence length such that more than 10,000 codes are available and that the resulting output manifests the characteristic "hiss" sound of receiver noise and appears as a train of random pulses on a five-inch scope.

The equipment of communication station 2 phase locks to the incoming square wave during the initial period of the transmission. This operation is performed by two phase-lock loops in the synchronizing circuits, the signal having been standardized in the audio digitizer. When the departure from a square wave is detected, the selected code (the same as that used by the transmitter) is set into the code generator, and the decoding process begins, reproducing the original digitized audio signal. Clock synchronism is easily maintained during the code sequence, since the zero crossings of the waveform appear only at multiples of the clock period. Since the synchronizing information consists of nothing more than the zero crossings of the signal waveform itself, the synchronizing signal, as such, is undetectable.

If an improper code is used in either the transmitter or receiver, the result, at the receiver, is one pseudo-random signal added to another. The audible result is another noise-like signal. Thus, since all the codes are unique and pseudo-random, all codes are equally effective; and one wrong code is virtually indistinguishable from another. Since the receiver must be synchronized with the selected code at the start of the transmission, a transceiver must be on and in the receive mode at the beginning of and at all times during the transmission, or the message will not be decoded.

The basic equipment frequency of the illustrated embodiment herein described is slightly above three kilocycles. This, coupled with the synchornizing system of the phase-locking on the signal, minimizes the transmission bandwidth requirements.

Figure 2:
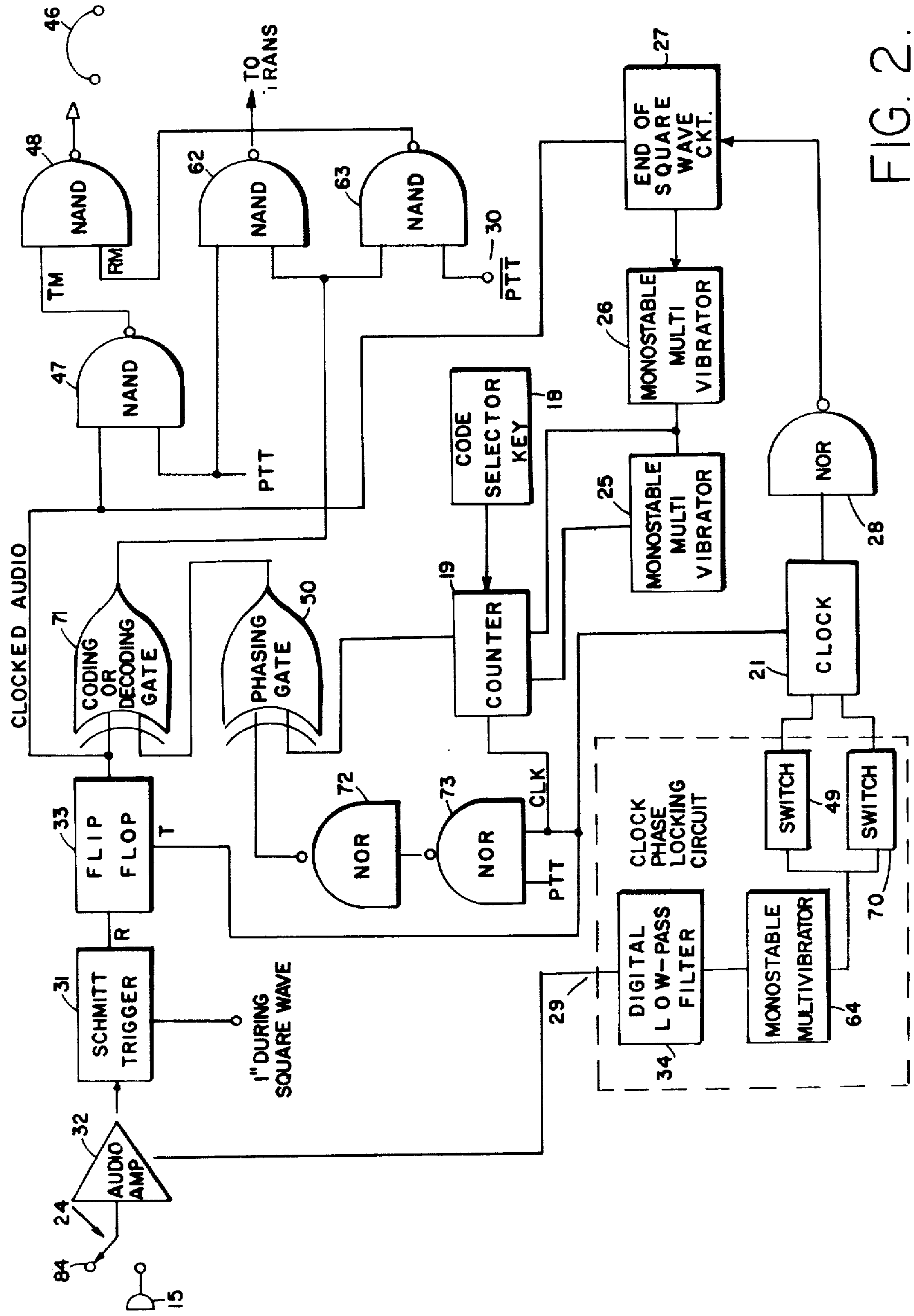
FIG. 2 is a block diagram illustrating the encoding and decoding components of one station of the privacy communication system of the invention.

Referring now to FIG. 2, there is illustrated thereby a block diagram including all of the essential components in a single communication station. Portions of this circuit are operative only in either transmit or receive operation. This will be made clear by the detailed description of operation to be presented hereinafter. In the block diagram of FIG. 2, a switch 24 is provided to connect the unit to either microphone 15 or telephone line or radio receiver connection 84. Switch 24 is connected to audio amplifier 32 which, in turn, has its output connected to Schmitt trigger 31. In the transmit mode of operation, audio amplifier 32 amplifies, clips and limits the audio voltage waveform. In combination, audio amplifier 32 and Schmitt trigger 31 provide a digitized signal. Flip-flop 33 is steered by the Schmitt trigger and triggered by clock 21. A clock phase locking circuit 29 consisting of digital low-pass filter 34 and monostable multivibrator 64 and bipolar switches 49 and 70 achieves synchronization when the system is in a receive mode of operation. NOR gate 28 inverts the clock signal from clock 21, providing a $\overline{CLK}$ for end-of-square-wave circuit 27. The end-of-square-wave circuit 27 detects when the initially transmitted square wave ceases, and then loads counter 19 with the appropriate code selector key 18. Loading of the code selector key is accomplished through monostable multivibrator 25. Monostable multivibrator 26 is effective to clear counter 19 to all zeros before the code is loaded. NOR gates 72 and 73, in combination with exclusive OR gates 50 and 71, cooperate to combine the output of counter 19 with the output of flip-flop 33, thereby providing the pseudo-random digital code output. NAND gates 47, 48, 62 and 63 cooperate to direct the digitized code signal to either earphones 46 or to the transmitter in response to "push-to-talk" button 30.

In the transmit mode, the equipment is set by depressing the "push-to-talk" button 30. At the start of the transmission, an unmodulated square wave is emitted at the basic equipment frequency, which in the present example is 5 KC. This waveform is produced for a preset period of time of 500 milliseconds to allow time for stabilization of the transmitter output, the receiver agc transient response, the receiver clock phase lock. After this preset delay produced by the synchronizing circuits, the selected code is set into the linear pseudo-random code generator, and encoding begins. From this time on, the output of the system is a pseudo-random pulse train, made up of the digitized voice which is logically added with code from the code generator.

The voice waveform is thus digitized in both amplitude and time. The resulting waveform is a rectangular wave, which has zero crossings only at multiples of the clock period.

Figure 3:
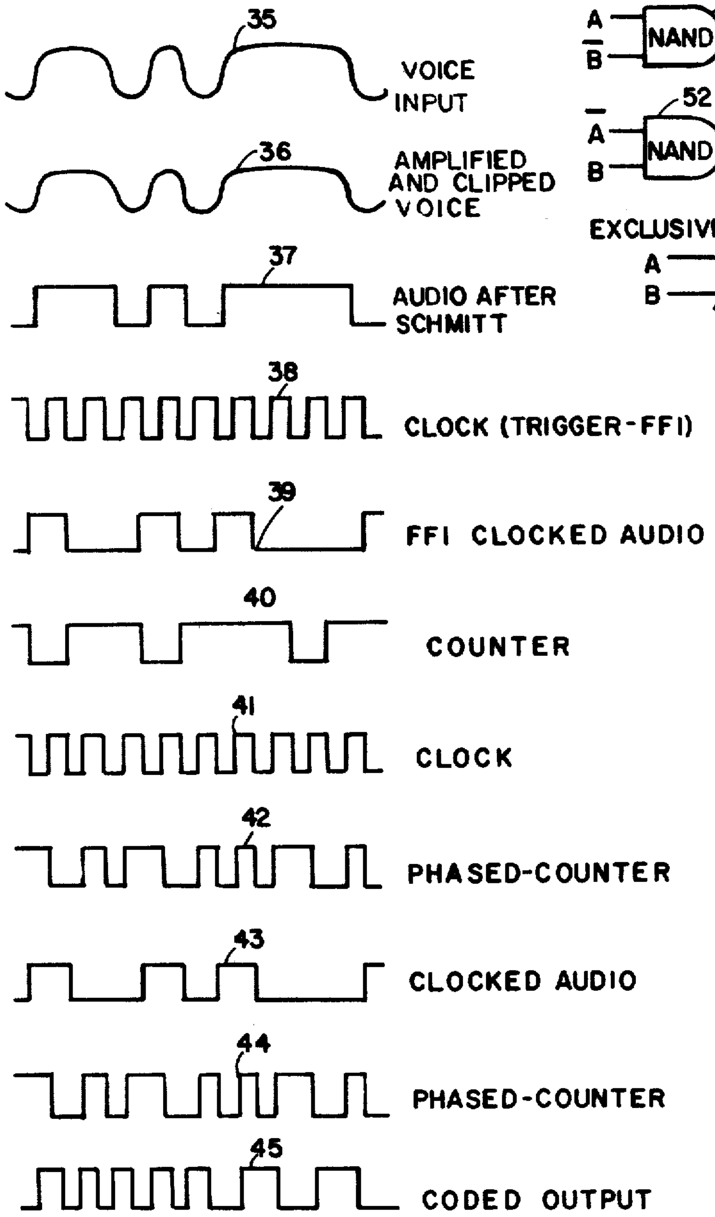
FIG. 3 illustrates various waveforms developed by the digitizing and encoding circuits of FIG. 2.

The Schmitt trigger 31 has one input—from the audio amplifier 32. The audio amplifier 32 has two inputs in the transmit mode. The first is the voice of the operator. The second is a dither square wave. The purpose of the dither square wave is to provide an output from the Schmitt trigger 31 that will cause the square wave flip-flop 33 to be turned on continuously. The dither wave does not affect the Schmitt trigger output when there is an actual voice input to the audio amplifier of greater amplitude than the dither input. The result, then, is that the output of the Scmitt trigger is a 10 KC square wave, when dither is on, or a rectangular wave from a clipped voice. The output from the Schmitt trigger is applied to the reset connection of flip-flop 33. The output of the clock 21 is applied to the trigger input of flip-flop 33. The effect of this is to maintain a form of digitized voice which is still recognizable as being voice, with a message efficiency over 85%, but which has the transitions, that is, the zero crossing of the digitized voice, at exact clock intervals. Waveforms 37, 38 and 39 of FIG. 3 illustrate how this is accomplished. Waveform 37 shows the digitized voice output from the Schmitt trigger 31 over a short period of time. Waveform 38 shows the clock input to flip-flop 33. Waveform 39 shows the "clocked audio" or digitized voice, which has now been adjusted so that changes from the 0 to the 1 state or vice versa take place only at multiples of the clock interval and then only at the negative-going edge of the pulse (negative in this case refers to voltage level, not logic level, waveforms 37, 38 and 39 being shown as voltage levels).

If waveform 39 is compared with waveform 37, it can be seen that, though the voltages are reversed, the relative periods of short and long duration are in effect identical, so that a person listening to the output responsive to waveform 39 would be able to hear human voice and interpret the message. Clocked audio output is used in two areas; in the first and most simple use, it is applied to the earphones of the operator who can then hear his own voice, can recognize if something is wrong, and will not have the feeling of speaking into a vacuum.

It should be noted that the input to the earphones 46 of the clocked audio is not applied directly to the earphone. Instead, the clocked audio goes through NAND gates 47 and 48, the first of which operates at all times in the transmit mode. The second NAND gate 48 serves as an OR gate by passing the operator's voice in transmit mode or the decoded message in receive mode. The other use of the clocked audio is as one of the inputs to exclusive OR gate 71. It is this exclusive OR gate which actually provides the coding of the voice message. The other input to the exclusive OR gate 50 is standard clock input. The output of the exclusive OR gate is referred to as the phased counter output.

The reason for combining the counter output and the clock output in an exclusive OR gate is because operation of the receiver would be quite difficult if only the output of the counter itself were combined with the clock audio. As the count output of the counter continued, there would be longer and longer periods of time where the output remained at a constant level. In many cases, this would be interpreted by other circuits in both the transmitter and the receiver as being a DC level. In many cases the length of time the DC level would exist would be greater than the time constant of circuits in the transmitter and the receiver. This would lead to degradation of intelligibility and to non-intelligibility under certain conditions. It is therefore necessary that this apparent DC level be changed into a square wave where the length of time existing in a particular level is not so long.

Figure 4:
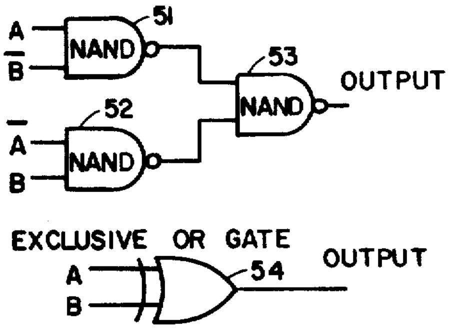
FIG. 4 illustrates schematically the exclusive OR gate component of the system of FIG. 2.
Figure 5:
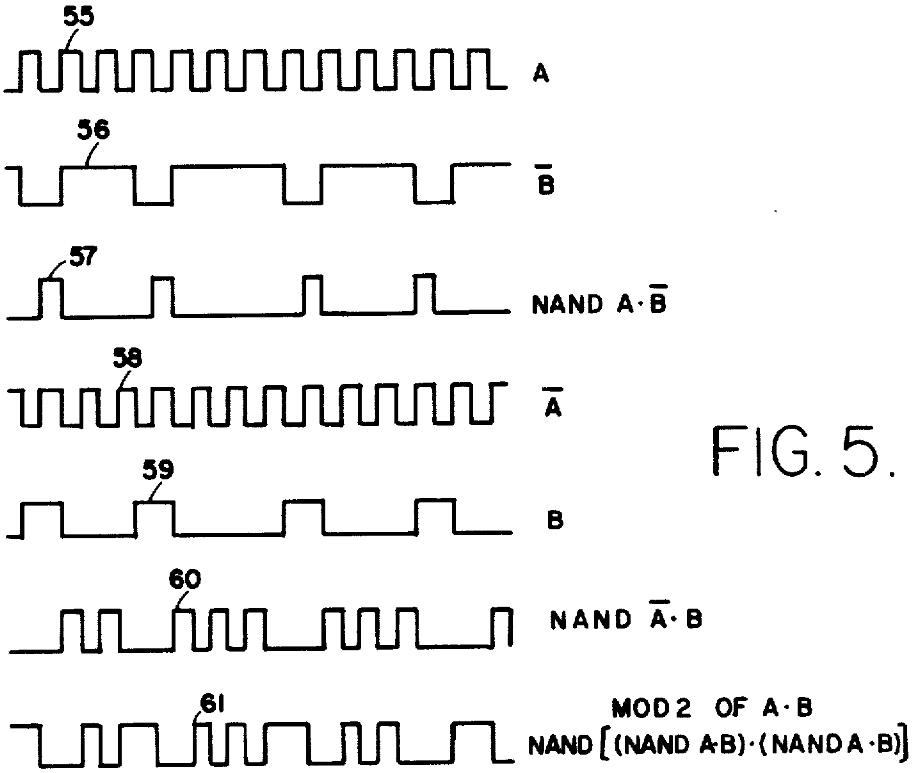
FIG. 5 illustrates typical waveforms generated by the exclusive OR gate of FIG. 4.

The exclusive OR gate, the symbol of which is indicated by reference numeral 54 in FIG. 4, can be considered from the functional viewpoint as being composed of two NAND gates that provide inputs to a third NAND gate and that are combined as shown by NAND gates 51, 52 and 53 of FIG. 4. The operation of an exclusive OR gate is comparatively simple and will be explained with reference to FIG. 5. Considering two functions, wave A and wave B, the input to the first NAND gate would be A as shown by waveform 55 and B as shown by waveform 56. When both are combined in a NAND gate, the output is as shown by waveform 57. The input to the other NAND gate is A and B. These are shown by waveforms 58 and 59. The output of this second NAND gate is shown by waveform 60. When the outputs of the two NAND gates are combined in a third NAND gate, the output of this third NAND is shown by waveform 61. For a simple rule to determine the output of an exclusive OR gate, the following may be stated:

1. If the two input signal polarities are the same, the output is a logical zero.

2. If the two input signal polarities are different, the output is a logical one.

Those rules will only apply in a system using logic of a similar nature to the present system—that is, where the "0" logic level is plus voltage, and the "1" logic level is ground.

It can be seen, then, that the two inputs to the coding exclusive OR gate are the clocked audio as shown by waveform 43 and the phased counter input as shown by waveform 44 of FIG. 3. These two waveforms are combined under the rules which affect an exclusive OR gate. The output of the OR gate will be seen to be coded output, as shown by waveform 45 of FIG. 3. Waveform 45 is, of course, an example of the type of output of the coding gate and will appear over a longer period of time to be quite random to a listener. It is this coded output that is applied to two NAND gates 62 and 63. One of the NAND gates is enabled in the transmit mode so that the output of the coding gate is applied to this NAND gate, to a final amplifier and thus to the transmitter, where it is transmitted. The input to the second NAND gate is used in the receive mode. This signal is fed through an amplifier to the earphones.

The input to a third gate from flip-flop 33 is the one used to supply the operator's voice through an amplifier to his own earphones.

During receive (or decoding) operation, the incoming signal which is the coded output of the transmitter is shown by waveform 45. When received by the system connected to the radio receiver, this will appear as the same signal shown by waveform 65 of FIG. 6 at the output of the Schmitt trigger 31. The decoding of the coded output is in many ways the opposite of the coding. The "push-to-talk" button 30 is, of course, not used during receive operation.

The coded input is again applied through the first audio amplifier 32 and through the Schmitt trigger 31 and so to the square wave flip-flop 33, where it is used with the phased clock input. In the receive mode, the clock input is the trigger to flip-flop 33, and the coded voice is applied to the steering of flip-flop 33. The output of the flip-flop can be referred to as coded clocked audio and is shown by waveform 68 of FIG. 6. This coded clocked audio is combined in the exclusive OR gate—decoding gate. This is the same gate that was used in transmission operation as the coding gate, and is now a decoding device. It is the coded clocked audio that is combined in this gate with the output of the counter. Unlike the transmit mode, where the second input to the coding gate is the phased-counter output, in the receive, the second input to the decoding gate is the normal counter output.

Figure 6:
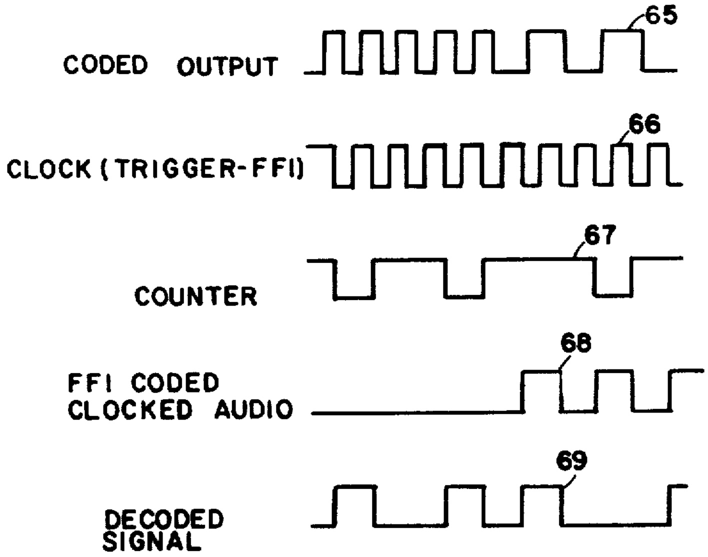
FIG. 6 illustrates waveforms developed by the circuits of FIG. 2 in the receive mode of operation.

The results of combining the counter output and the coded clocked audio output in the exclusive OR decoding gate can be seen by the waveform 69 of FIG. 6. A comparison of waveform 69 with waveform 37 of FIG. 3 will show that the system has again obtained what was called the clocked audio or decoded signal. It should be noted that the output is not the original digitized voice obtained during the transmission operation at the output of the Schmitt trigger; it is instead identical with the output of flip-flop 33 in the transmitter.

Figure 7:
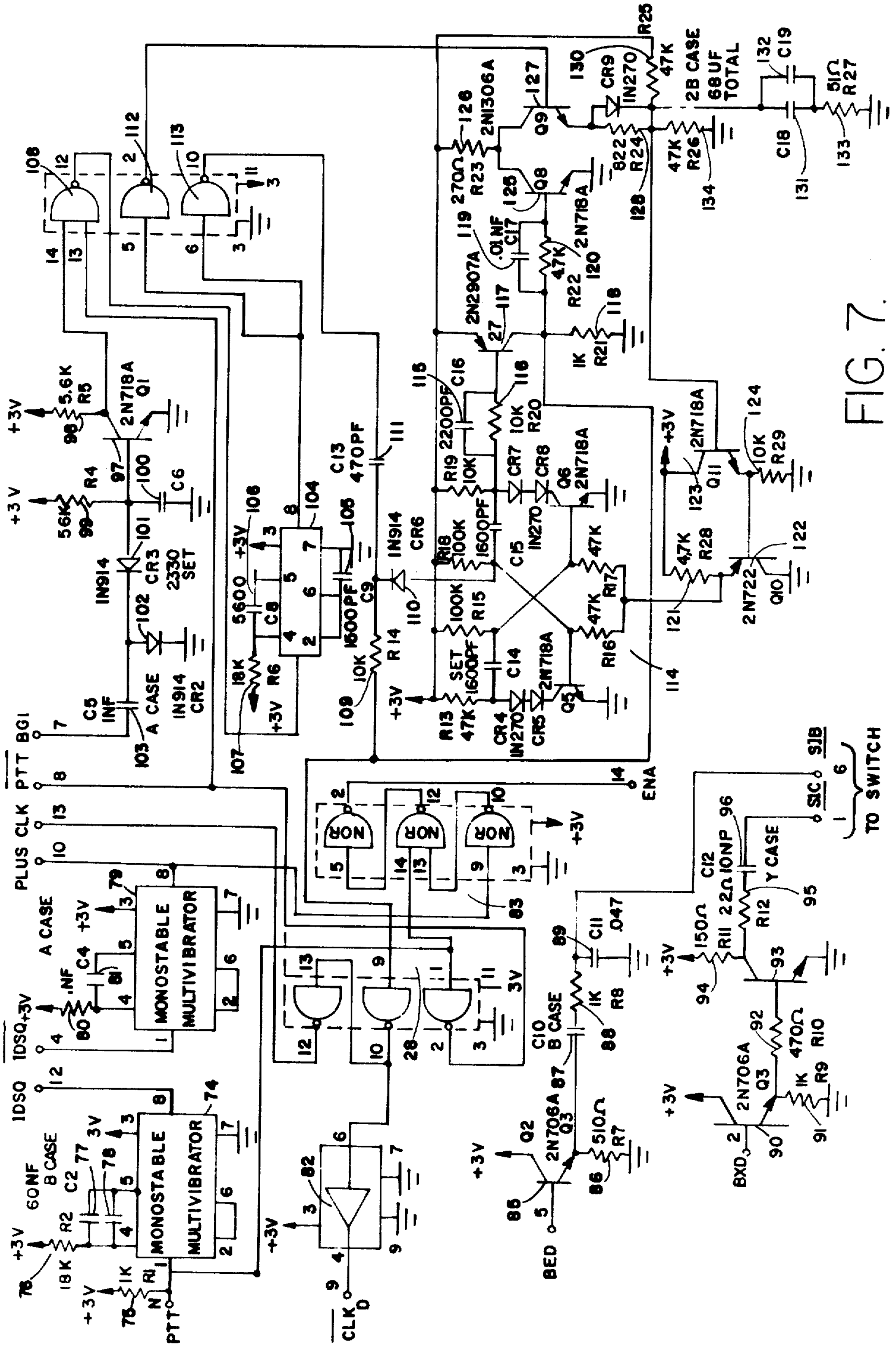
FIGS. 7 and 8 are schematic diagrams illustrating operation of the synchronizing circuits of the present invention.
Figure 8:
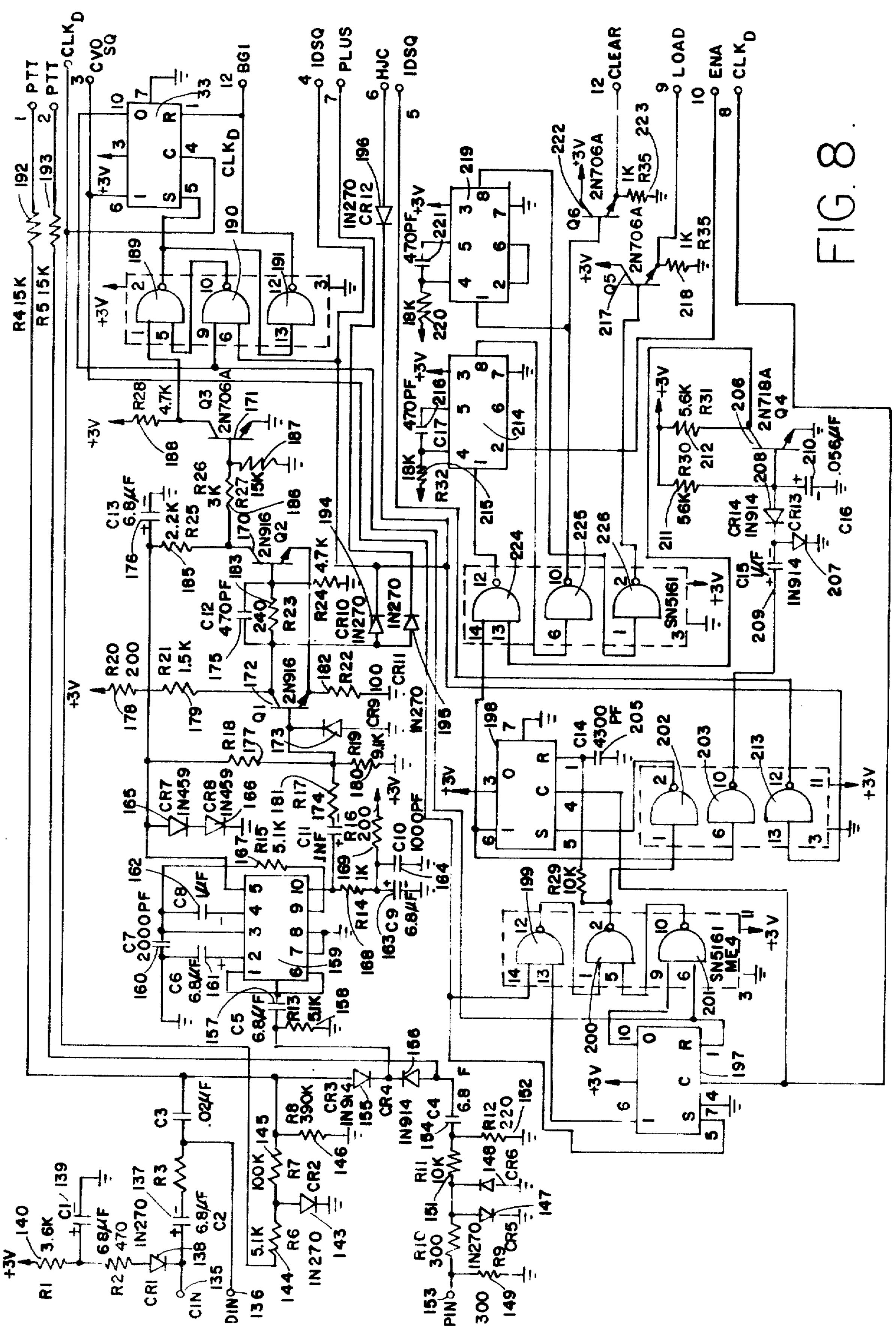
Figure 9:
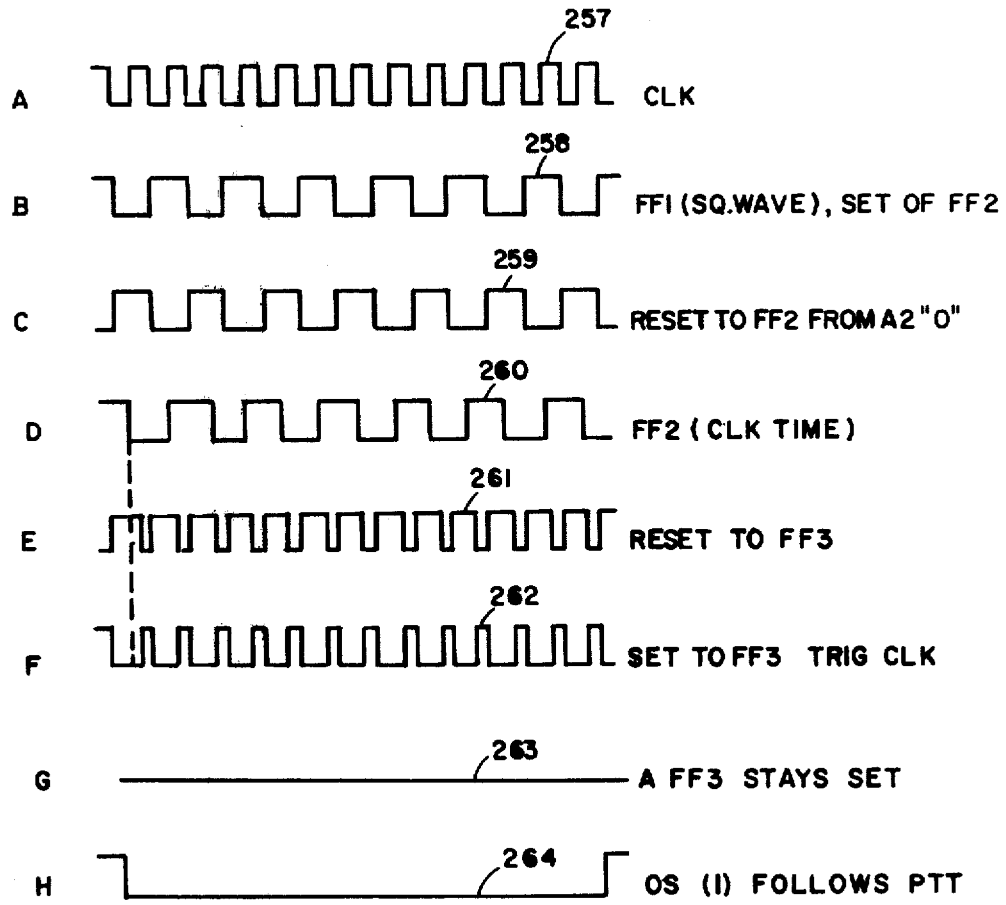
FIGS. 9, 10 and 11 illustrate various waveforms developed during the synchronization operation of the circuits of FIGS. 7 and 8.
Figure 12:
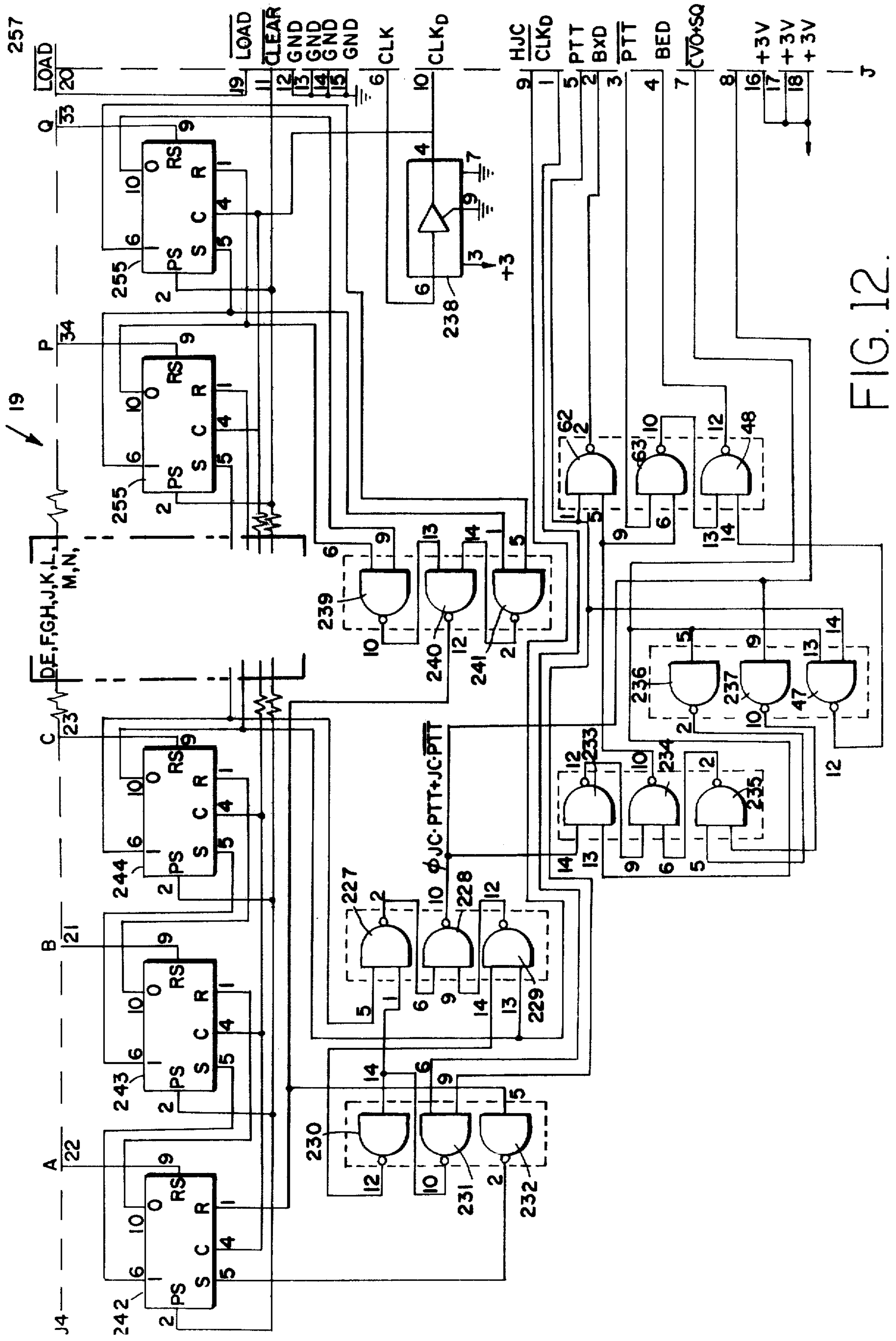
FIG. 12 is a schematic diagram of the code generator utilized in the invention.

The schematic diagrams of FIGS. 7, 8, and 12 illustrate in detail the operation and constituent components of the block diagram of FIG. 2. Referring now in particular to FIG. 7, the circuit which determines the time that the initial square wave will be present consists of monostable multivibrator 74, resistor 76, and capacitors 77 and 78. Another circuit is provided which consists of monostable multivibrator 79, resistor 80 and capacitor 81, and is suitable to effect an 800-microsecond dead time following the square wave determined by the above-described circuit. Reference numeral 83 indicates an arrangement of NOR gates that are used as an inverter and are effective to enable monostable multivibrator 25. The arrangement of NOR gates indicated by reference numeral 28 inverts the clock signal to provide a CLK; and amplifier 82 is provided as a means for driving the clock. Transistor 85, capacitors 87, 89 and resistors 86 and 88 provide a drive for earphones 46. A transmitter driver is provided by the circuit including transistors 90, 93, capacitor 96, and resistors 91, 92, 94 and 95. The clock phase lock circuit includes NOR gate 108, which operates as bipolar switch 49. Also included in the clock phase lock circuit is one-shot 64, which comprises multivibrator 104, capacitors 105 and 106, and resistor 107. Lowpass filter section 34 of the clock phase locking circuit compries a transistor 97, diodes 101 and 102, capacitors 100 and 103, and resistors 98 and 99. NOR gates 112 and 113 effectively invert the output of monostable multivibrator 104. The system clock 21 comprises a free-running astable multivibrator designated generally as 114, together with transistors 117, 125, 127, 122, 123; capacitors 115, 119, 131, 132; diode 129; and resistors 116, 118, 120, 121, 124, 126, 128, 130, 133 and 134.

The above-described circuit provides phase locking as follows. The output of the clock multivibrator 114 is amplified by transistors 117 and 125. The amplified clock output (collector of transistor 125) is coupled through the sampling switch, transistor 127, to the low pass filter comprising resistors 133 and 128 and capacitors 131 and 132. Two 47K resistors 130 and 134 at the base of transistor 123 provide the bias which determines center frequency of the clock. The bias is applied to the clock phase control through complimentary emitter-follower transistors 122 and 124. The output of the low-pass filter is connected to the emitter-follower input to produce the phase control.

The sampling pulse is applied to the base of the sampling transistor. The duration of the pulse is 40 microseconds, and it occurs at a submultiple of the transmitter clock (master signal). During the 500 ms synchronization time, the pulse occurs every 200 microseconds. After synchronization, the time between pulses may be greater than 200 microseconds.

During the 40 microseconds that the pulse is present, a low impedance path is created from the output of the clock amplifier to the input of the low-pass filter. If the clock is in the proper phase, it will have a zero crossing 20 microseconds after the start of the sampling pulse. This will produce at the input of the low-pass filter a symmetrical square wave which, when filtered, produces a DC voltage equal to that created by the two bias resistors 130 and 134. Therefore, no change in phase is produced. If the phase were incorrect, the zero crossing would not have occurred in the center of the sampling pulse. A non-symmetrical square wave would have been applied to the input of the low-pass filter, which would have changed the DC level on the base of the transistor 123, resulting in a phase correction.

Between sampling pulses, the error voltage developed by the low-pass filter is retained by capacitors 131 and 132. The discharge path is through the two 47K bias resistors 128 and 134, and the base of transistor 123. This time constant is large compared to the time constant when the sampling switch is on. When the switch is on, the charge can be changed quickly to correct any phase error. When the switch goes off, the charge must remain to hold the correction until the next sampling period, when a new correction can be made.

Having particular reference now to FIG. 8, there is illustrated thereby a schematic diagram of the synchronizing circuits of the unit. Terminal 135 provides a connection for a carbon microphone. Inasmuch as a carbon microphone is incapable of driving the system by itself, a circuit for providing a suitable current therefor is included and comprises diode 138, capacitors 137 and 139, and resistors 140 and 141. A coupling capacitor 142 couples this circuit to the unit. Alternatively, terminal 136 provides a connection for a dynamic microphone and bypasses the above-described circuit. A circuit designed to attenuate the clock signal to a correct value is provided by diode 143 and resistors 144, 145 and 146. Diodes 155 and 156 constitute switch 24. An amplitude normalizing circuit comprising diodes 147 and 148, capacitor 154, and resistors 149, 150, 151, 152 and 153 is also provided. Coupling of the audio amplifier to the unit is achieved by means of capacitor 157 and resistor 158. The audio amplifier stage of the unit consits of the circuit arrangement illustrated by multivibrator 159; capacitors 160, 161, 162, 136, and 164; diodes 165, and 166; and resistors 167, 168 and 169. The Schmitt trigger 31 consists of transistors 170, 171 and 172; diode 173; capacitors 174, 175, and 176; and resistors 177, 178, 179, 180, 181, 182, 183, 184, 185, 186, 187, and 188. NOR gates 189, 190 and 191 are arranged to invert the output of Schmitt trigger 31 prior to delivering it to flip-flop 33. The end-of-square-wave circuit 27 consists of a pulse stretcher circuit comprising diodes 207 and 208; transistor 206; capacitors 209 and 210; and resistors 211 and 212; together with multivibrators 197 and 198; NOR gates 199, 200, 201, 202, and 203; capacitor 205; and resistor 204. NOR gates 224, 225, and 226 serve as an inverter to invert the output of end-of-square-wave circuit 27. The circuit for clearing counter 19 of zeros, referred to above by reference numeral 26, consists of monostable multivibrator 214, a timing RC circuit consisting of resistor 215 and capacitor 216, and a driver consisting of transistor 217 and resistor 218. The circuit for loading the code key into the circuit above referred to by reference numeral 25 consists of monostable multivibrator 219; together with a timing RC circuit consisting of resistor 220 and capacitor 221; and a drive circuit consisting of transistor 222 and resistor 223.

Referring now to FIG. 12, there is illustrated a schematic diagram of the code generator. An exclusive OR gate 50 is illustrated by the arrangement of NAND gates 227, 228, 229, 230, 231 and 232. Exclusive OR gate 71 is illustrated by the combination of NAND gates 233, 234, 235, 236, and 237. NAND gates 239, 240 and 241 cooperate as an exclusive OR gate to provide feedback for counter 19. Amplifier 238 operates as a clock driver.

Counter 19 is illustrated schematically by flip-flops 242 through 256. The code key, when loaded into the circuit, has the effect of connecting the load point 257 of the circuit to one of the connection points A through Q.

Integral with the operation of the coding and decoding circuits is the operation of the initial synchronization in the transmitter. This will now be considered in detail. The purpose of the 500 milliseconds plus approximately 800 microseconds after the "push-to-talk" button is depressed is to allow the receiver circuits time to synchronize with the transmitter circuits. This synchronization is particularly important and absolutely necessary in the case of the counter circuit which provides the decoding mechanism in the receiver.

The clock operates continuously from the moment the ON-OFF switch is turned ON until it is turned OFF. Thus, the clock is continually giving out a 10 KC square wave, even before the "push-to-talk" button is depressed.

The explanation of the synchronization time can best be understood by reference to FIGS. 7, 8, 9, 10, 11 and 12. Depressing the "push-to-talk" button enables multivibrator 159 which, for 500 milliseconds, will send a logic "1" level through diode 194 to the Schmitt trigger 31. The effect of this is to keep Schmitt trigger 31 permanently turned off and a ground level voltage output (a one logical level) at the output of the Schmitt trigger. This one logical level is also applied as one of the inputs of logic gate 71. The purpose of applying the logical one level to this gate is to allow the combination of the gate and flip-flop 33 to continually cycle during the entire 500-millisecond period. An examination of the connections will show that, as long as a logical level 1 input is maintained on gate 71, the flip-flop 33 will continually set and reset, in effect acting as a divide-by-two counter for the clock square wave. The clock square wave pulses are applied to the trigger connection of flip-flop 33.

The output of flip-flop 33 during the 500-millisecond period of monostable multivibrator 159 will be a square wave with a frequency precisely half that of the clock square wave, that is, a 5 KC square wave. This is shown by waveforms 257 and 258 of FIG. 9. The output from the 1 output, redundant, is then applied to the set input of multivibrator 197. The output from the 0 output of flip-flop 33 will be a square wave of the same frequency, but 180° out of phase with the 1 output.

The trigger input to multivibrator 197 is a clock bar signal ($\overline{CLK}_D$), or a square wave of the clock frequency but 180° out of phase with it. The resulting output from the multivibrator 197, from the 1 output, will appear as waveform 260 of FIG. 9. This is a square wave of a frequency precisely half that of the clock (that is, a frequency of 5 KC), but 90° out of phase with the logical 1 output from flip-flop 33. The effect is to cause multivibrator 197 to be phased by $\overline{CLK}$. The output of multivibrator 197, The 90-degree-phase-shifted square wave, is applied as one of the inputs to exclusive OR gate 50. The other input to exclusive OR gate 50 is the 0 output of flip-flop 33.

Figure 10:
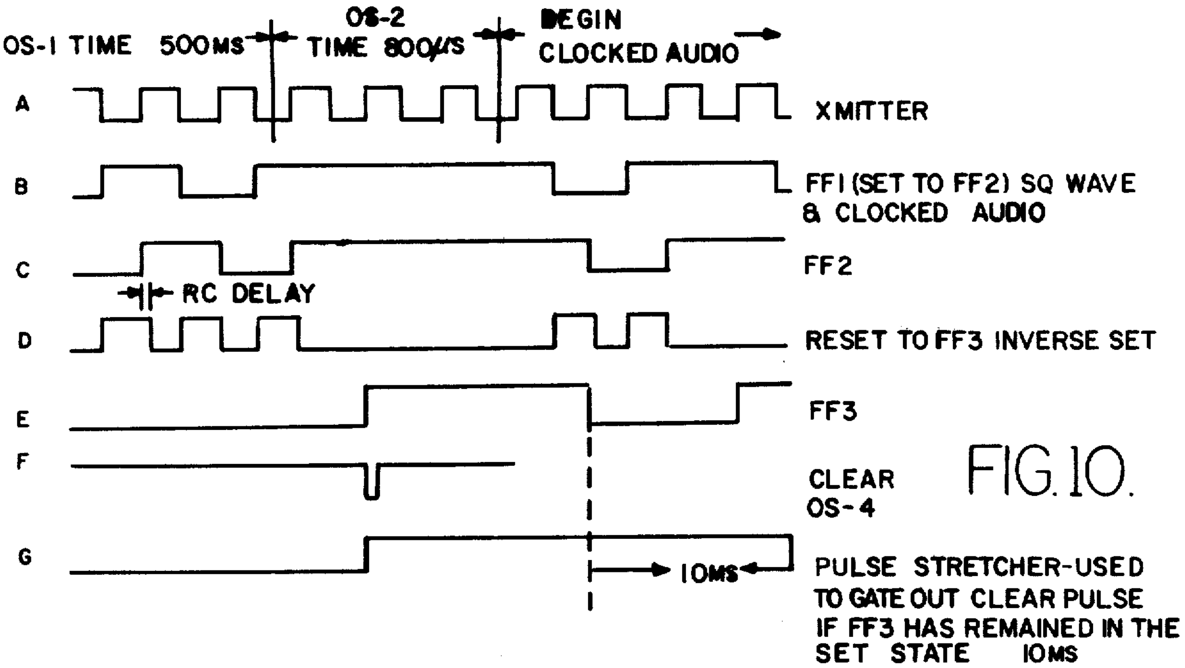
Figure 11:
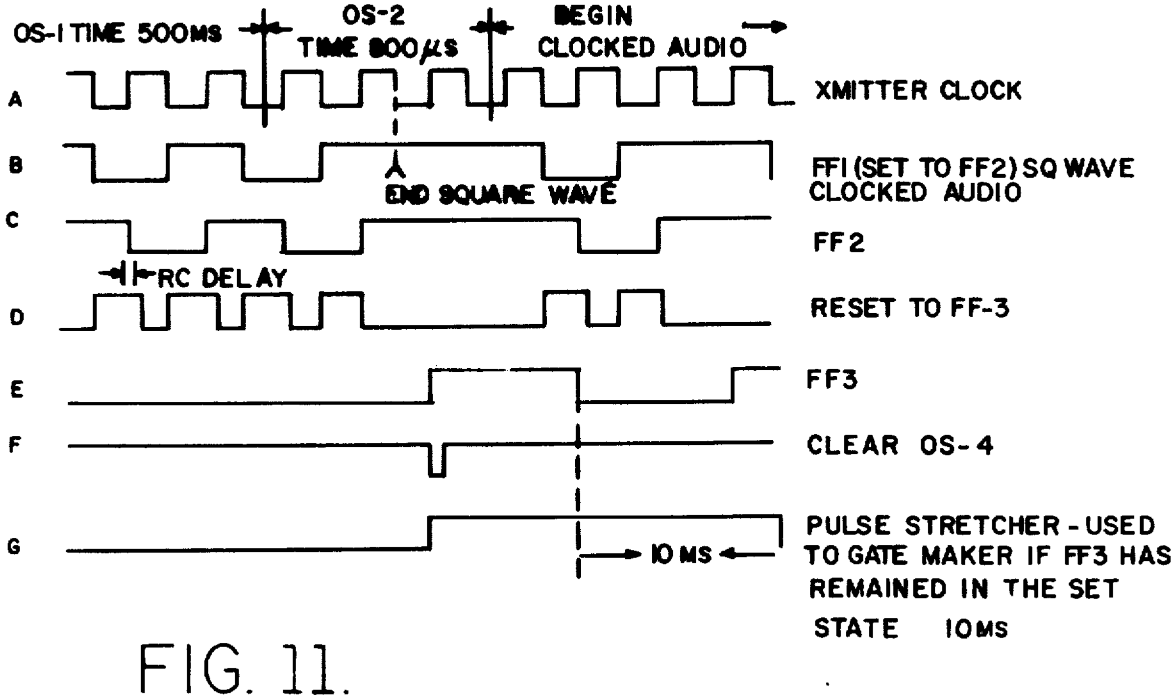

The output of the exclusive OR gate 50 will be slightly extended because of an RC circuit on the output. The output of the exclusive OR gate 50 is inverted and applied to the set input of multivibrator 198. By comparing waveforms 261 and 262 of FIG. 9, it can be seen that these two signals are 180° out of phase, and that the negative going edge of the pulse train shown by waveform 261 is very slightly delayed beyond the rising edge of the pulse train shown by waveform 257. The effect of these two inputs to multivibrator 198, plus the use of $\overline{CLK}_D$, as the trigger, is that multivibrator 198 remains in the set condition during the entire 500-millisecond period of multivibrator 159. When the 500-millisecond period of multivibrator 159 has elapsed, monostable multivibrator 74 begins to generate a 1 logical level, that is, a ground output. As far as Schmitt trigger 31 is concerned, it will continue to be held by the ground level being applied to diode 195, so that the output of Schmitt trigger will remain at ground during the following 800-millisecond period of monostable multivibrator 74. However, the input to gate 71 is no longer held at ground, which means that the combination of the gate and flip-flop 33 will no longer continue to cycle with a square wave of one-half the frequency of the clock. This can be seen by referring to the waveforms 265-277 of FIGS. 10 and 11. FIGS. 10 and 11 show the operation of the clearing pulse in the transmitter for two separate conditions. Since the time in which the "push-to-talk" button is depressed is a matter of chance, the effect of the end of the 500-millisecond period is also a matter of chance. Therefore, two of the many possible combinations and conditions have been shown in FIGS. 10 and 11. In FIG. 10, for example, the 500-millisecond period ends just after the output on flip-flop 33 has risen from a ground to a plus 2-volt level, that is, just after the flip-flop has changed state from the set to the reset condition.

Normally the flip-flop would again change state on the next negative going clock cycle; however, the output of gate 71 is a logic 1, and along with the 1 output of the Schmitt trigger 31 during the 800-microsecond period, flip-flop 33 continues its high voltage output, that is, it remains in the reset condition.

The effect on the output of multivibrator 197 (logical one output) is the same as flip-flop 33 logical output, but delayed by 50 microseconds. The multivibrator 197 output will be maintained in the reset state, but the onset of the state of this reset condition will be 50 microseconds later than it was for the output of flip-flop 33. As before, the reset input to multivibrator 197 and the set output thereof are combined in the exclusive OR gate 50, and this output is applied through the RC circuit to the reset input of multivibrator 198. Multivibrator 198 is not reset until the first $\overline{CLK}$ pulse after square wave ends.

When the 500-millisecond square wave ends, the output from multivibrator 197 begins a long period in the reset state. The reset to multivibrator 198 is maintained at ground level until after the 800-microsecond period begins, due to the 1 logic level from monostable multivibrator 74.

When the 800-microsecond period is over, the Schmitt trigger 31 output is no longer held at ground, and the effect is to allow flip-flop 33 to change state at the next clock pulse if there has been an audio input from the amplifier.

As shown by waveform 276 of FIG. 11, the output from the 1 side from multivibrator 198 will be maintained at the same ground (logical 1) level during the first portion of the 800-microsecond period as it has been maintained in the 500-millisecond period.

When multivibrator 198 changes state, the output from the logical 1 terminal is inverted. This output then triggers a pulse stretcher (transistor 206 and associated circuitry). The output of this pulse stretcher is applied to a NAND gate, the other input to which is the output from multivibrator 198. The effect of this is to trigger monostable multivibrator 79, which is a 6-microsecond-duration one-shot. The output of monostable multivibrator 79 is used to clear the counter to prepare for loading the code. The purpose of the pulse stretcher is to make sure that the clear pulse maker will not operate if multivibrator 198 has remained in the set state less than 10 milliseconds. Once the counter has been cleared, it can than begin counting, and therefore coding, with the output from flip-flop 33. The output of this flip-flop becomes the clocked audio voice.

One more item should be discussed: monostable multivibrator 74 operates 6 microseconds after the start of monostable multivibrator 75, and the effect of its output is to enable the code to be applied to the encoding circuits. The card key, it will be remembered, determines at what point in the counting cycle the counter will begin.

Once the clearing and load signals have been applied to the counter and the load in the transmitter, the clearing and loading can begin. It is absolutely necessary that the counter circuits in the receiver be cleared by the same synchronizing signal as in the transmitter, so that the receiver circuits may begin counting at the same point as the counter in the transmitter circuit. Otherwise, the decoding of information will be impossible.

In the receiver, as in the transmitter, the beginning of the synchronized operation of the counter circuits must be triggered by a chance of state of multivibrator 198 and, again, as in the transmitter operation, the leading edge of pulse generated by this change of state will be used to trigger monostable multivibrator 74 and monostable multivibrator 75, to supply a pulse to clear to counter 19 and to apply the load to the counter.

When transmitting, it as assumed that the receivers to which the message is directed are on and have been on for some time. Thus, the receiver clocks are running, and the microphone input to the receiver circuit is in the receive position.

The received input will be applied through the audio amplifier, through the Schmitt trigger, and directly through gate 71 to flip-flop 33. There is no application of signals through the two diodes 194 and 195 to hold the Schmitt trigger in a constant 1 state. Before the time the transmitter begins transmitting, any atmospheric noise or random signals are picked up and are not decoded, since no information is contained in these signals. When the transmitter begins transmitting, it transmits during the first 500 milliseconds a square wave with a frequency of 5 KC, that is, 200 microseconds pulse length. These comparatively long pulses will be applied through the amplifier 32, the Schmitt trigger 31 and that gate 71 to the steering of flip-flop 33. The receiver clock has been operating continuously and is the trigger input to flip-flop 33. The 1 output of flip-flop 33 is applied as the set input to multivibrator 197. This same output is applied to the decoding gate, but since (1) no information is being transmitted in voice, no decoding is possible; and (2) even if information were being transmitted, the circuits have not been synchronized with the transmitter; therefore no decoding is possible. Only the output of flip-flop 33, which is supplied to the SET of multivibrator 197 will be considered at this point. This is shown by waveform B of FIG. 10. The output of multivibrator 197, shown by waveform C, again lags behind the output of flip-flop 33 as shown in waveform B by 90° or by 50 microseconds. The output of multivibrator 197 is combined as in the exclusive OR gate with the 0 side of flip-flop 33 and, after passing through an RC circuit, acts as the reset steering of multivibrator 198. This is shown by waveform D of FIG. 10. This reset is a square wave and acts to keep multivibrator 198 in the set state.

It should be noted that the principal purpose of the 500-millisecond square wave is to allow sufficient time for the receiver clock to become synchronized with the transmitter clock. Each of the 5 KC square waves from the transmitter is supplied through the audio amplifier to the clock locking circuit, where the trailing edge of each square wave triggers a one-shot. The output of the one-shot, in turn, operates a pair of synchronizing circuits which trigger or, if necessary, inhibit the receiver clock so that every other receiver clock pulse begins at the same time as a transmitter 5 KC square wave pulse. During normal operation (i.e., after the end of the synchronizing period), the receiver clock is still kept locked to the transmitter clock by the 10 KC transmitter clock square wave, which will be received whenever there is a lull in the operator's voice.

When the transmitter-500-millisecond square wave period ends, the output of flip-flop 33 maintains itself in the 0 state for a longer period of time than the 100 microseconds it has been maintaining. The effect of the receiver circuits is that the output of multivibrator 197 in the receiver now maintains a ground level (a logical 1) for longer than the 100 microseconds that the circuits have been operating. This is shown by waveform E of FIG. 10. This means that the reset to multivibrator 198 will be at ground when the trigger pulse comes, and the multivibrator will be reset. The output of multivibrator 198 is applied through a gate and used to trigger monostable multivibrator 214 and monostable multivibrator 219, which clear the counter circuits and, 6 microseconds later, apply the load to the counter circuits. A 10 ms pulse stretcher is also triggered to inhibit the output of multivibrator 198 from the triggering the clear and load one-shots if it has remained in the set state less than 10 ms. Operation of the receiver now begins in the sense that the circuits can now begin to attempt to decode. Each begins 12 microseconds after one-shot 3 is enabled.

Up to this point, we have merely synchronized the circuits. This does not mean that both the transmitter and receiver are operating with the same code. In order for information to be encoded and decoded properly, the receiver and transmitter must have key cards inserted into their counters which have the same code.

These codes determine at what point in the counting sequence the particular counter will start, once it has been cleared, and load signal applied. Thus, for proper decoding of a coded signal, the card key in the receiver must match the card key in the transmitter, as well as having the timing and synchronization of the receiver and transmitter circuits be exact.

It is to be understood that the above-described arrangements are illustrative of the applications of the principles of this invention. Numerous other arrangements may be devised by those skilled in the art without departing from the scope of the invention.

Having thus described the invention, what is claimed as new and desired to be secured by Letters Patent is:

We claim:

1. A privacy communications system, comprising:

means for generating a digital signal;

means for generating a pseudo-random digital code signal;

means for generating a clock signal, and a signal combining and separating circuit, including first and second exclusive OR gates, said first exclusive OR gate having inputs from the system clock means and from the output of said means for generating a pseudo-random digital code signal, said second exclusive OR gate having inputs from said first exclusive OR gate and from the output of said means for generating a digital signal.

* * * * *